US009401064B2

(12) United States Patent
Young

(10) Patent No.: US 9,401,064 B2
(45) Date of Patent: Jul. 26, 2016

(54) MULTI-WHEEL SYSTEM AND METHOD

(71) Applicant: Deforest Fox, LLP, Reno, NV (US)

(72) Inventor: Kent Young, Reno, NV (US)

(73) Assignee: Respin LLC, Reno, NV (US)

( * ) Notice: Subject to any disclaimer, the term of this patent is extended or adjusted under 35 U.S.C. 154(b) by 0 days.

(21) Appl. No.: 13/693,102

(22) Filed: Dec. 4, 2012

(65) Prior Publication Data

US 2013/0143640 A1 Jun. 6, 2013

Related U.S. Application Data

(60) Provisional application No. 61/567,093, filed on Dec. 5, 2011.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3213* (2013.01); *G07F 17/3211* (2013.01); *G07F 17/3286* (2013.01)

(58) Field of Classification Search

CPC .................................................. G07F 17/3213
USPC ............................................................ 463/20
See application file for complete search history.

(56) References Cited

U.S. PATENT DOCUMENTS

| | | | | |
|---|---|---|---|---|
| 6,068,552 | A * | 5/2000 | Walker et al. | 463/21 |
| 6,705,944 | B2 * | 3/2004 | Luciano | 463/20 |
| 7,226,357 | B2 | 6/2007 | Vancura | |
| 7,946,914 | B2 | 5/2011 | Vancura | |
| 2002/0065124 | A1 * | 5/2002 | Ainsworth | G07F 17/34 463/20 |
| 2011/0227281 | A1 | 9/2011 | Vancura | |

* cited by examiner

*Primary Examiner* — Milap Shah
*Assistant Examiner* — Thomas H Henry
(74) *Attorney, Agent, or Firm* — Marc D. Foodman; Ferdinand IP

(57) ABSTRACT

A system and method for use in one or more casino establishments for offering a game of chance with multiple wheels. A player may bet on one or more of the wheels to win an award. The resulting pay is based on the combination of the final position of the wheels after they come to a stop. The award may be the cumulative value for winning outcomes on each of the wheels, it may be a set outcome depending on the combination of symbols on a win line across the wheels, or it may include special awards such as multipliers and wild card wins depending on the wheel configuration. The system and method are offered on an electronic multi-wheel gaming system with multiple player terminals connected to a set of electro-mechanical wheels or video wheels displayed on a screen, but may also be deployed in other forms such as on a live table game with a live operator of mechanical wheels, or on a general purpose computing device connected to a network.

23 Claims, 4 Drawing Sheets

MULTI-WHEEL SYSTEM AND METHOD

RELATED APPLICATION INFORMATION

This application claims priority benefit from U.S. Provisional Application No. 61/567,093, filed on Dec. 5, 2011.

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Mechanical wheel-type wagering games have been in operation in casinos for many, many years. One such game is the Big Six wheel, also known as the Big Six, Money Wheel, Wheel of Fortune or Chocolate Wheel. For purposes of this specification, the term "Big Six" will refer to any or all of these different types of mechanical wheel games.

Big Six is an unequal game of chance played on a large vertical wheel that is spun by a live dealer or operator. A Big Six wheel 100 is shown in FIG. 1. As can be seen in FIG. 1, a wheel 105 is divided into a number of equal segments 110 separated by spokes or pins with each segment having an associated number or value. In the United States, Big Six typically has 54 segments, while in Australia, there are usually 52 segments. During operation, a number of players place wagers on a table 115 marked with values 120 corresponding to those on wheel 105. Once all bets are placed, the dealer spins wheel 105. When the wheel stops, a winning segment 125 is indicated by a pointer 130 usually mounted on the top of wheel 105. Wheel 105 spins and is slowed by a flexible rubber or leather flap which rubs against the pins as they pass to impart friction and slow down wheel 105.

There are a number of variants of the Big Six game. The variants may use wheels with different numbers of segments to alter the payout probabilities, different symbols in the segments representing different bet values and payout amounts, or having different probabilities for any particular symbol shown in the segments. The Money Wheel variant is the most common in casinos in the United States. The symbols appearing in the segments are 1, 2, 5, 10 and 20 where the numbers represent bill amounts and the number of segments containing each number varies with the smaller numbers appearing more frequently. Two special symbols, such as a joker 135 and a casino logo 140 may also appear. To permit a player to earn a large payout award, special symbols may appear only once to set a low probability of hitting such a symbol. Players stand around table 115 with a felt top and place wagers on one or more of the symbols prior to the spin. Typically, a 1 pays at odds of 1:1, a 2 pays at odds of 2:1, a 5 pays at odds of 5:1, and so on. The joker and the logo pay at 40:1 or 45:1 depending on local gaming regulations or the practice of the casino.

Big Six wheels are fun for players and also offer a simple game that first time players can enjoy without the usual intimidation factor that goes along with more complex wagering games such as craps or baccarat. The game is easy to understand and because many people can play at once, there is a community feeling that increases excitement with all players cheering for their chosen number to win. The game also moves quickly and it is easy to play multiple games in a short time period.

Big Six has a number of drawbacks. First, Big Six requires a dealer to monitor and operate the game including accepting wagers from players, spinning the wheel and making payouts. Big Six is regularly shut down during slow periods in the casino due to staffing and oversight issues. In addition, the wheel itself is mechanical, and while the technology has advanced to improve how the wheel spins, the probabilities are impacted by the mechanical movement of the wheel and its parts over time.

The present invention is an electronic multi-wheel system and method for accepting wagers and making payouts based on the outcome(s) of a spin on one or more wheels. Multiple wheels may be spun individually or together, and the outcome or outcomes on each wheel are determined to make a payout.

BRIEF DESCRIPTION OF THE DRAWINGS

For a better understanding of the present invention, and to show more clearly how it functions, reference will now be made, by way of example, to the accompanying drawings. The drawings show embodiments of the present invention in which.

DETAILED DESCRIPTION OF THE INVENTION

Figure 1:
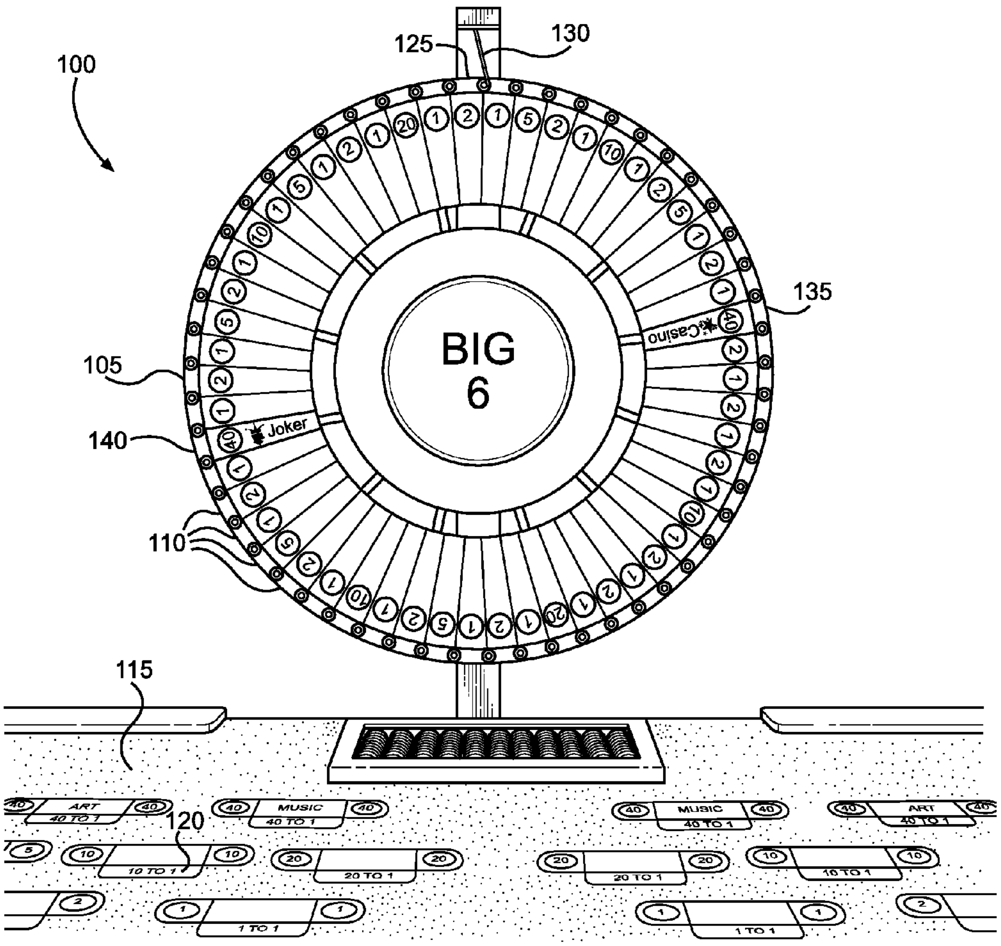
FIG. 1 is a prior art Big Six game.

The present invention will now be described more fully with reference to the accompanying drawings. It should be understood that the invention may be embodied in many different forms and should not be construed as limited to the embodiments set forth herein. Throughout FIGS. 2-4, like elements of the invention are referred to by the same reference numerals for consistency purposes.

FIG. 1 is a prior art Big Six game that is described in the background section above.

Figure 2:
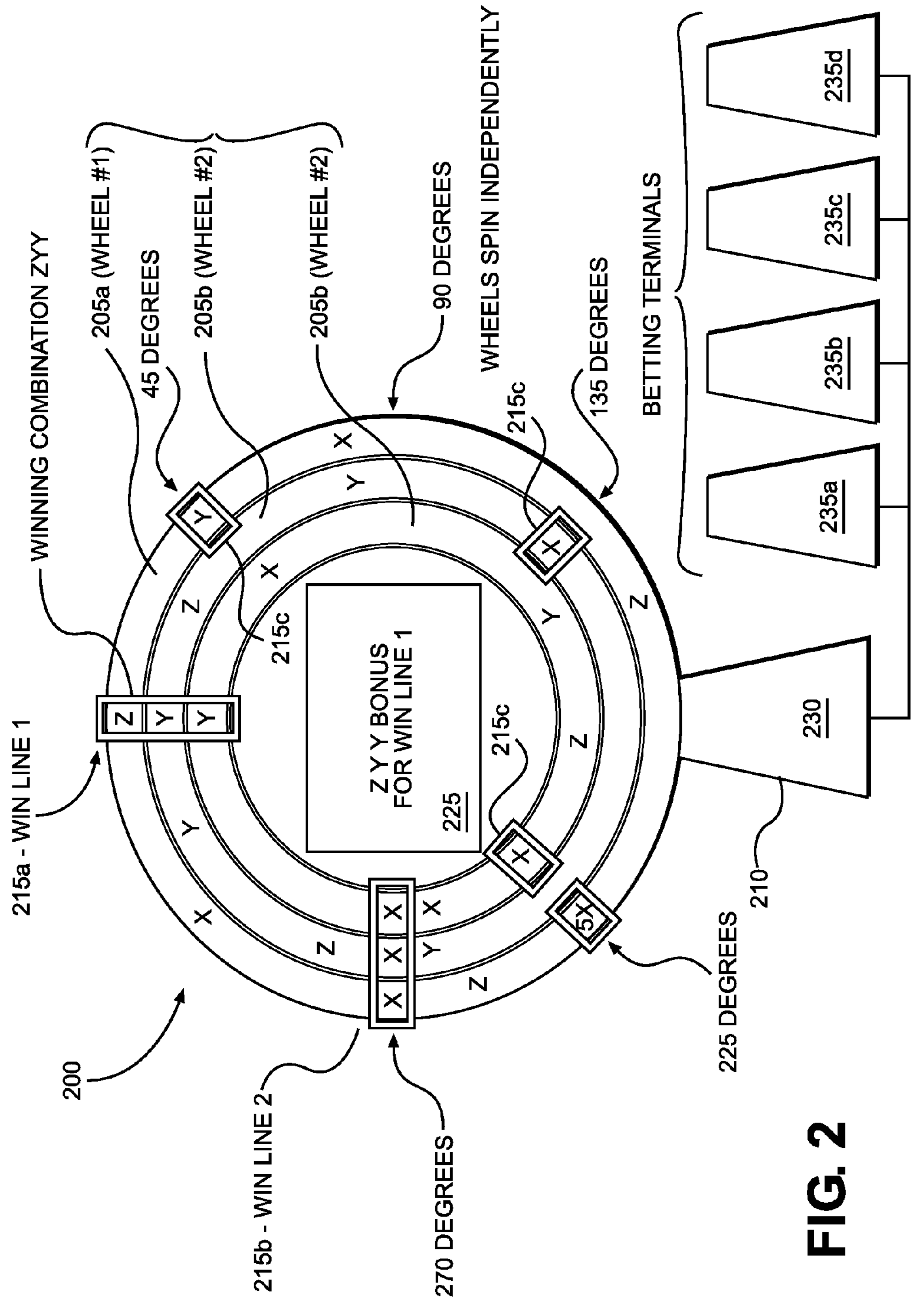
FIG. 2 is a diagram of an embodiment of an electronic multi-wheel system of the present invention.

FIG. 2 is an electronic multi-wheel system 200. Electronic multi-wheel system 200 has a set of electronically controlled wheels 205*a-c* which may number one or more. In the system of FIG. 2, three wheels are shown and are labeled wheel #1 (205*a*), wheel #2 (205*b*) and wheel #3 (205*c*). Each wheel 205 is centered on stand 210 and spins independently of the other wheels. It should be understood that the spinning motion may be either clockwise or counterclockwise. For example, outer wheel 205*a* and inner wheel 205*c* may both spin in a clockwise direction, while middle wheel 205*b* may spin in a counterclockwise direction, or vice versa. Alternatively, all three wheels may spin in the same direction, clockwise or counterclockwise.

Operation of wheels 205 is controlled by an electronic controller 230 that is microprocessor based and is located inside stand 210 or elsewhere in a secure area where it can be communicatively connected to wheels 205. Controller 230 is responsible for operations of wheels 205 including generating random numbers that are converted to game outcomes. For each game outcome, wheels 205 are stopped with the symbols on the periphery of wheels 205 in particular positions.

Win line indicators or paylines 215 are shown at different points around the periphery of wheels 205 and include a position on each of the wheels so that a symbol or number on each wheel lines up on win line 215 when the wheels stop at the end of a spin. In the system of FIG. 2, three different win lines (215*a*, 215*b* and 215*c*) are shown, but there may be a varying number of paylines, numbering more or less than three, that are incorporated in the game as determined by the system designer. Win lines 215*a* and 215*b* are simple, straight lines drawn across each of the wheels. Other win lines such as 215*c* may be configured using different positions for each wheel from around the periphery of the wheels. For example, win line 3 (215*c*) includes the following symbols: 1) at 45 degrees from the top for the outer wheel 205*a;* 2) at 135 degrees from the top of middle wheel 205*b*; and 3) at 225 degrees from the top of inner wheel 205*c*.

It may also be desirable to include more than one symbol on a single wheel in combination with one or more symbols on the other wheels to form a win line. To indicate to a player the win lines that have been played, each win line may be lighted in a different color as an area around each of the symbols like the blocked areas shown for win lines 215 on wheels 205.

Each wheel 205 includes a set of numbers or symbols as indicated in FIG. 2 by letters "X," "Y," and "Z." As discussed with respect to the Big Six Wheel of FIG. 1, each number or symbol may appear one or more times on each wheel. The greater the number of the same symbol appearing on a particular wheel or across all of the wheels, the higher the probability that that symbol will show up on a win line when the wheels stop spinning and the game ends.

It should also be understood that lowering the probabilities for particular symbols on one or more of wheels 205 may be achieved using virtual wheels in electronic memory that is part of electronic wheel controller 230. The use of virtual wheels allows the designer to pay larger jackpots than would otherwise be available with the use of physical wheels alone that have a limited number of positions. Virtual wheels are well known in slot machine games for physical spinning reels and also for use in bonus wheels such as Wheel of Fortune® manufactured by IGT and other wheel based bonus games.

As can be seen in FIG. 2, at the end of the game that has been played, the symbols Z, Y and Y are positioned on win line 1 (215*a*). This may or may not result in a win. It is possible to consider the result of each wheel independently and award a player for a resulting win line symbol for each wheel. In that case, if a player bets on more than one wheel and wins on more than one wheel, the payout would be the cumulative total of the wins on each wheel.

Alternatively, a game designer may choose win lines that use combinations of symbol positions across the multiple wheels 215*a-c* to provide a win. For example, win line 2 (215*b*) has the combination X, X, X across the three wheels 215*a-c* at the 270 degree mark from the top. Instead of paying out an award for each of the three Xs independently and adding the cumulative total of those pays, a player may be awarded a prize according to a win table that predefines the outcome for any combination of winning symbols. In this case X-X-X may be a winner and since it appears on win line 2 at the 270 degree position, any player placing a wager on win line 2 would be paid according to the win table for X-X-X.

Another example of a win line configuration is win line 3, (215*c*). This win line is not a straight line across the three wheels. It is formed from a group of positions located at different angles on the wheels. Win line 3 includes a position on outer wheel 205*a* at 45 degrees, a position on middle wheel 205*b* at 135 degrees and a position on inner wheel 205*a* at 225 degrees. The symbols Y, X and X appear on win line 3 in FIG. 2.

To make the game more fun and to allow the player to have different options, the player may choose how many win lines to activate for any particular game by placing a bet on the desired win line(s). More than one win line may be in play during any particular game for each player. The amount of the award paid out to a player at the end of the game will depend on the number of win lines, the amount bet per win line and the combination of symbols on each win line. In this embodiment, win line combinations are set forth in a paytable similar to that used on traditional slot machine. The paytable is accessible to the player on betting terminals 220 and may also be displayed on a screen or other display associated with system 200.

In addition to regular payouts for predefined outcomes on win lines 205, a player may also be awarded a multiplier or wild card win for certain combinations on wheels 205. For example, a five times ("5×") or ten times ("10×") pay may be awarded if a particular symbol lines up on one of the wheels at a particular position, such as the 5× symbol at 225 degrees on outer wheel 205*a*.

It should be understood that system 200 may be included in a networked jackpot system with other multi-wheel systems or any other gaming devices such as slot machines. Networked jackpot systems including progressive jackpot systems and random jackpot systems are well known to those skilled in the art of gaming devices.

A bonus screen 225 is available for use in system 200 at the center of wheels 205 and may be in the form of a large flat panel display such as a plasma or LCD screen. Bonus screen 225 may alternatively be placed outside of wheels 205 in a position above the wheels or otherwise nearby. Bonus screen 225 may take the form of any bonus indicator, a variety of which are known, including but not limited to a reel, "pick a prize" reveal type bonus indicators, timers, arrows, races, another wheel, etc. Bonus screen 225 may also be in the form of a dedicated device specifically designed for a particular type of bonus game, such as a large physical reel with multiple potential outcomes.

Bonus screen 225 is used to display bonus opportunities for users of system 200. In one embodiment of a multi-wheel system 200 with a bonus, a player who lines up certain symbols on a win line 205 is eligible for a bonus opportunity on bonus screen 225. For example, if a player lines up three Xs as shown on win line 2 (215*b*), the player is eligible for a bonus game on bonus screen 225. Alternatively, the bonus may be triggered by a particular symbol in a particular position, such as on inner wheel 205*c* at 135 degrees. The bonus may be a secondary event similar to bonus events on a traditional slot machine. Bonus screen 225 may be a LCD or plasma screen allowing flexibility in the types of bonuses that may be offered.

Figure 3:
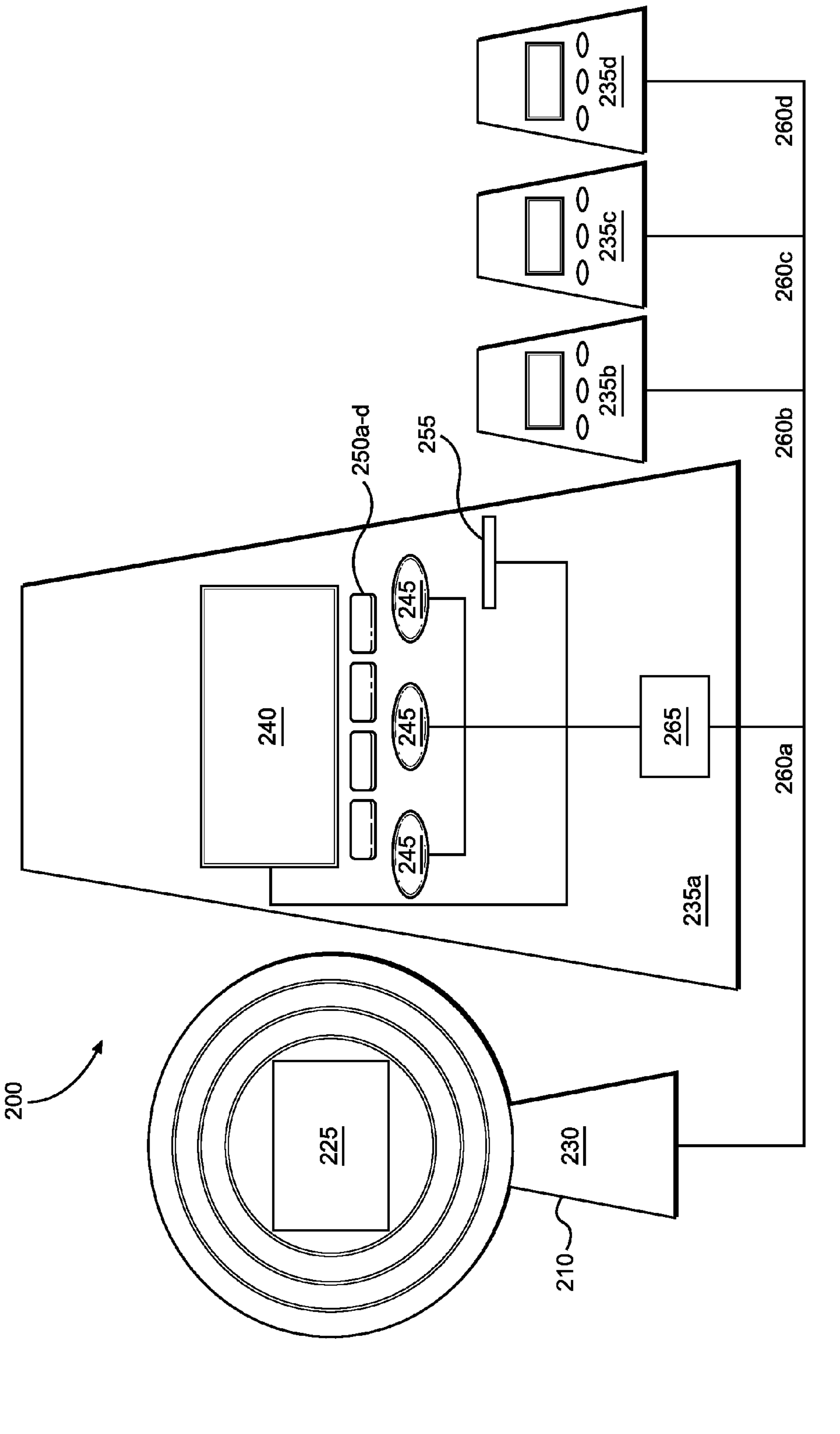
FIG. 3 is a view of the betting terminal used in the electronic multi-wheel system of the present invention.

FIG. 3 is a view of system 200 with multiple betting terminals 235, one of which is enlarged (235*a*) to show the components of each betting terminal 235. Betting terminals 235 are positioned in close proximity to wheels 205 so that players at each betting terminal 235 are close to the action and can watch as the wheels spin during game play. Betting terminals 235 include a screen 240 and buttons 245 that allow the player to interact with system 200. Screen 240 displays information to the player such as win tables. It can also be used to show the available win lines or to display a small duplicative version of the wheels as they spin during play. At the end of the game, screen 240 may display the different wins achieved by the player for that game.

Buttons 245 may be used in a manner similar to those on a traditional slot machine to make selections such as number of coins to bet, number of win lines to bet, cash out, start game, stop wheels and any number of other gaming operations. It should also be understood that screen 240 may be a touch screen that allows alternative player interaction or redundant player interaction with buttons 245. A group of meters 250*a-d* may also be included on terminal 235 to display information to the player such as credits, amount of win, amount bet, bet per win line, etc. Also incorporated into betting terminal 235 is a bill acceptor 255 to accept currency that is inserted into terminal 235 and loaded onto the credit meter so that it is available for a player to place wagers.

Betting terminal 235 is controlled by a microprocessor based terminal controller 265. Terminal controller 265 controls the operations of terminal 235 and is connected to display 240, buttons 245, bill acceptor 255 and other components of terminal 235. Terminal controller 265 is also in communication with controller 230 so that player interaction on betting terminal 235 and play of the game on wheels 205 is coordinated over communication lines 260*a-d.*

Figure 4:
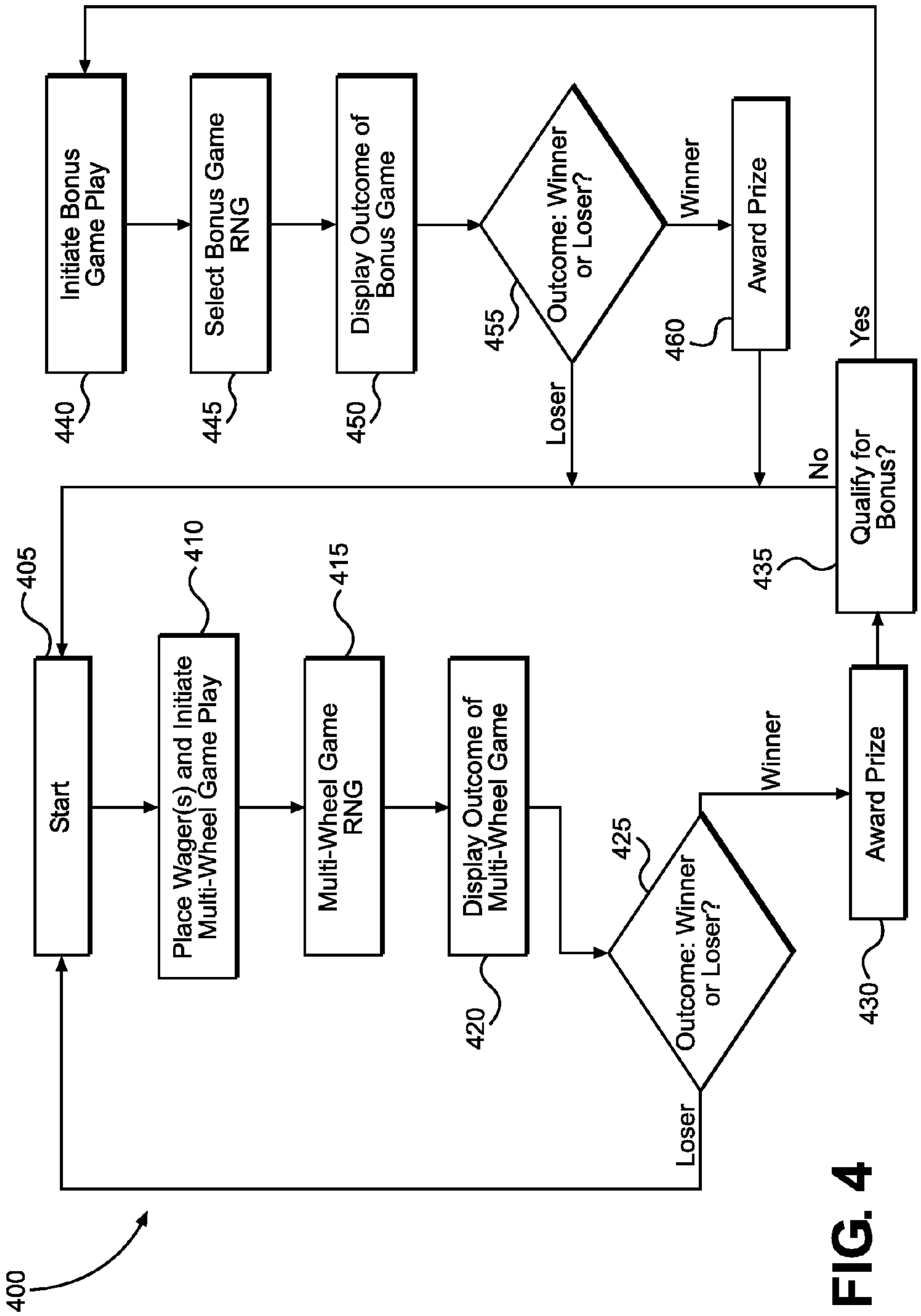
FIG. 4 is a flow chart of game play on the electronic multi-wheel system of the present invention.

For games on the multi-wheel system 200 shown in FIGS. 2-3, the game play follows a sequence of steps shown in the flow chart 400 of FIG. 4. The player begins at start 405 and places a wager 410 to initiate play of a multi-wheel game on terminal 235. Controller 230 is programmed with a time interval during which it waits for wagers from all terminals 235*a-d* to be placed. When the time period expires, the wagers are locked in by controller 230 and the game begins with the wheels starting to spin. After the wheels are spinning, a multi-wheel game random number generator in controller 230 operates to select a random number 415. The random number is converted to a game outcome and that corresponding outcome is displayed 420 on wheels 205*a-c*. The game outcome may be either a winner or a loser for each player depending on wagers made by the players and win lines (or paylines) selected. A determination is made at step 325 by controller 230. For winners, the player is awarded the appropriate prize at step 430, usually in the form of credits added to a credit meter that is one of meters 250 on terminal 235.

If a bonus game is included, player(s) may achieve certain combinations of symbols on the multi-wheel game to qualify for the bonus round at step 435. If players are eligible for the bonus game, the bonus game is initiated at step 440 and displayed on bonus display 225. A bonus game random number is selected to determine the outcome of the bonus round at step 445. The outcome of the bonus round is displayed at step 450 on the bonus display 225 and a determination is made as to whether each player participating in the bonus round wins or loses at step 455. For the winners, a prize is awarded at 460. Once winners are awarded a prize, winners and losers of the bonus round, as well as any new players may start a new game at 405.

While the invention has been described with respect to the figures, it will be appreciated that many modifications and changes may be made by those skilled in the art without departing from the spirit of the invention. For example, wheels 205 as described are physical wheels like that used in the traditional Big Six game. However, wheels 205 may alternatively be electronic renderings of wheels shown on a video display. Also, wheels 205 are shown in the figures as vertically positioned. It is also possible to configure system 200 with wheels 205 horizontally positioned with players sitting around the periphery of the wheels. Any variation and derivation from the above description and drawings are included in the scope of the present invention as defined by the claims.

What is claimed is:

1. A gaming system for playing a game with an outcome that is based on a symbol combination, comprising:

a wheel display comprising:

a first wheel that spins around a central axis divided into segments with each segment having an associated symbol;

a second wheel that spins around the central axis divided into segments with each segment having an associated symbol wherein the symbols on the second wheel are positioned beyond a peripheral edge of the first wheel; and at least one win line corresponding to a position on each of the first and second wheel to include at least one symbol on each wheel;

a controller for controlling operation of the first and second wheel wherein the controller controls the following operations for each spin of the game on the gaming system: (a) accepting a wager that includes selection of at least one player designated symbol on each wheel from a full set of symbols appearing on each wheel, and includes selection of at least one player designated win line on one or more wheels; (b) initiating a spin of both wheels; (c) selecting a winning symbol at random from among a full set of symbols displayed on each wheel; (d) causing the wheels to stop spinning at the end of the game in position to display the winning symbol on each wheel on the at least one win line; and (e) providing an award to a player for a win where the winning symbol matches the player designated symbol for either wheel or both wheels;

at least one electronic terminal connected to the controller for use by a player to participate in the game on the wheel display, the at least one electronic terminal comprising:

a wager acceptor for accepting a wager from the player;

at least one player input by which the player selects the at least one player designated symbol corresponding to the wager accepted for a particular spin of the game on the gaming system;

a screen on which information is displayed to the player, such information including a bet menu with options for symbol and win line choices with associated awards corresponding to an amount of the wager and the symbol and win line selected by the player during each spin of the game on the gaming system; and wherein upon completion of each spin of the game, a winning game outcome is determined to occur when the at least one player designated symbol lands on the at least one win line and notification of a win is displayed to the player on the screen for either wheel or both wheels, and further wherein a corresponding award is paid to the player at the terminal for a win.

2. The gaming system of claim 1 further comprising a display associated with the wheel display for displaying a bonus game.

3. The gaming system of claim 1 further comprises a third wheel in the wheel display operating such that:

the first wheel is an inner wheel that spins in a first direction;

the second wheel is a middle wheel that spins in a second direction; and the third wheel is an outer wheel that spins in the first direction wherein:

a player designates a symbol from among a full set of symbols on the third wheel;

the third wheel spins;

a winning symbol is selected on the third wheel;

the third wheel is stopped; and the player is provided with an award if the winning symbol selected matches a symbol on the third wheel that is positioned on the one or more player designated win line after the third wheel stops spinning.

4. The gaming system of claim 1 wherein the at least one win line is configured in a straight line across an area of one or more segments at the periphery of each wheel and includes the symbol on each wheel.

5. The gaming system of claim 4 wherein the award provided to the player is determined according to a paytable that predefines the amount awarded for a combination of symbols on the at least one win line.

6. The gaming system of claim 1 wherein the player may place a wager on a selected symbol on each wheel individually, and further wherein a total award amount is calculated as the cumulative total of the amount awarded for a particular symbol on the one or more player designated win line on each wheel.

7. The gaming system of claim 1 wherein the wheel display further comprises a win line that is configured to include positions on each wheel that are not arranged in a straight line.

8. The gaming system of claim 7 wherein an award is calculated as the cumulative total of the amount awarded for a particular symbol occurring on the one or more win line on each wheel.

9. The gaming system of claim 7 wherein an award is determined according to a paytable that predefines the amount awarded for a combination of symbols on the one or more win line.

10. The gaming system of claim 1 wherein the at least one wheel includes a special symbol that alters the value of the award.

11. The gaming system of claim 1 further comprising a networked jackpot system to which the gaming system is connected to provide a player additional awards for events associated with the networked jackpot system.

12. A method of playing a wheel game on a system including at least two wheels with a controller and at least one terminal having a wager acceptor, a player input and a screen, comprising:

accepting a wager by at least one player at a terminal to initiate play of the wheel game;

selecting a player designated symbol from a full set of symbols appearing on a first wheel using the player input for each spin of the game;

selecting at least one win line corresponding to a position on each of the at least two wheels that includes a symbol on each wheel for each spin of the game;

accepting a wager for each spin of the game that includes selecting a player designated symbol from a full set of symbols appearing on each wheel and one or more player designated win line on which the designated symbols will land using the player input;

confirming the player designated symbol, win line and a wager amount to the player on the screen for each wheel;

transmitting an instruction from the controller to spin the first and second wheels;

selecting wheel game random numbers on the controller that are converted to wheel game outcomes corresponding to a winning symbol for each wheel;

transmitting an instruction from the controller to stop the wheels wherein each wheel stops with the winning symbol on a win line;

determining whether the wheel game outcome for each wheel is a winning outcome, wherein a winning outcome results if the player designated symbol matches the winning symbol; and transmitting an instruction to the terminal to pay a player a predefined award for one or more winning outcomes.

13. The method of claim 12 further comprising:

determining eligibility for a bonus game on the controller that is displayed on a display associated with the wheel game wherein each players' eligibility for the bonus game depends on an outcome of the wheel game;

selecting a bonus random number on the controller that is converted to a bonus game outcome wherein the bonus game outcome is one of a plurality of outcomes in a predefined set including winning and losing outcomes;

transmitting an instruction from the controller to display a bonus game outcome upon completion of the bonus game; and transmitting an instruction to the terminal to provide the player at the terminal a predefined award for a winning bonus game outcome.

14. The method of claim 12 further comprising displaying a bonus game on a display associated with the wheel display.

15. The method of claim 12 wherein the wheel display comprises a third wheel wherein:

the first wheel is an inner wheel that spins in a first direction;

the second wheel is a middle wheel that spins in a second direction; and the third wheel is an outer wheel that spins in the first direction wherein:

a player designates a symbol from among a full set of symbols on the third wheel, along with one or more win lines covering the third wheel;

the third wheel spins;

a winning symbol is selected on the third wheel;

the third wheel is stopped; and the player is provided with an award if the winning symbol selected matches a symbol on the third wheel that is positioned on the one or more win line after the third wheel stops spinning.

16. The method of claim 12 wherein the at least one win line is configured in a straight line across an area of one or more segments at the periphery of each wheel and includes the symbol on each wheel.

17. The method of claim 16 wherein the award provided to the player is determined according to a paytable that predefines the amount awarded for a combination of symbols on the at least one win line.

18. The method of claim 12 wherein the player may place a wager on a selected symbol on each wheel individually, and further wherein a total award is calculated as the cumulative total of the amount awarded for a particular symbol on the one or more win line on each wheel.

19. The method of claim 12 wherein the wheel display further comprises a win line that is configured to include positions on each wheel that are not arranged in a straight line.

20. The method of claim 19 wherein an award is calculated as the cumulative total of the amount awarded for a particular symbol occurring on the one or more win line on each wheel.

21. The method of claim 19 wherein an award is determined according to a paytable that predefines the amount awarded for a combination of symbols on one or more the win line.

22. The method of claim 12 wherein the at least one wheel includes a special symbol that alters the value of the award.

23. The method of claim 12 wherein a networked jackpot system to which the gaming system is connected provides a player additional awards for events associated with the networked jackpot system.

* * * * *